(12) United States Patent
Bang et al.

(10) Patent No.: US 11,608,178 B2
(45) Date of Patent: Mar. 21, 2023

(54) LOUNGE CHAIR FOR AIRCRAFT

(71) Applicant: BOMBARDIER INC., Dorval (CA)

(72) Inventors: Seung Joon Bang, Laval (CA); Louis Gagnon-Seguin, Montreal (CA); Philippe Erhel, Montréal (CA); Tim Fagan, Beaconsfield (CA); Alexandre Curthelet, Montreal (CA); Vincent Dumais, Montreal (CA); René Bardier, Montreal (CA); Paul Fromont, Montreal (CA); Gradyn Ladd, Pincourt (CA); Jean-Philippe Guimond, Mirabel (CA); Mario Brunet, Sainte-Sophie (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 17/167,298

(22) Filed: Feb. 4, 2021

(65) Prior Publication Data

US 2021/0179272 A1 Jun. 17, 2021

Related U.S. Application Data

(63) Continuation of application No. 16/410,363, filed on May 13, 2019, now Pat. No. 10,940,950.

(60) Provisional application No. 62/671,106, filed on May 14, 2018.

(51) Int. Cl.
*B64D 11/06* (2006.01)
*A47C 21/00* (2006.01)
*B64D 11/00* (2006.01)

(52) U.S. Cl.
CPC ........ *B64D 11/064* (2014.12); *B64D 11/0641* (2014.12); *B64D 2011/0069* (2013.01)

(58) Field of Classification Search
CPC ...... A61G 7/015; A61G 7/018; A47C 20/041; B64D 11/0641
See application file for complete search history.

(56) References Cited

U.S. PATENT DOCUMENTS

| | | | |
|---|---|---|---|
| 2,031,124 A | 2/1936 | Perlesz |
| 4,095,296 A | 6/1978 | Ferro |
| 6,012,774 A | 1/2000 | Potter |
| 7,293,740 B2 | 11/2007 | Defilla et al. |
| 8,177,165 B2 | 5/2012 | Bettell |
| 8,806,682 B2 | 8/2014 | Hornbach et al. |
| 8,997,274 B2 | 4/2015 | Phillips |

(Continued)

FOREIGN PATENT DOCUMENTS

| | | |
|---|---|---|
| EP | 1621173 A2 | 1/2006 |
| GB | 2516437 A | 1/2015 |
| WO | 2011048384 A1 | 4/2011 |

OTHER PUBLICATIONS

Reverie Dream Supreme, https://www.bestpricesonbeds.com/reverie-dream-supreme-i-hybrid-customizable-mattress/, accessed on May 8, 2018.

(Continued)

*Primary Examiner* — Shin H Kim

(74) *Attorney, Agent, or Firm* — Norton Rose Fulbright Canada LLP

(57) ABSTRACT

An aircraft cabin comprising a credenza and a lounge chair disposed above the credenza is disclosed. The lounge chair is adjustable between a first configuration defining a first seating arrangement and a second configuration defining a second seating arrangement. Also disclosed is a mechanism to facilitate the adjustment of the lounge chair.

7 Claims, 11 Drawing Sheets

(56) References Cited

U.S. PATENT DOCUMENTS

| | | |
|---|---|---|
| 9,227,729 B2 | 1/2016 | Udriste et al. |
| 9,241,571 B2 | 1/2016 | Robertson |
| D783,332 S | 4/2017 | Kim |
| D785,360 S | 5/2017 | Rawls-Meehan |
| 9,763,840 B2 | 9/2017 | Rigsby et al. |
| 10,940,950 B2 | 3/2021 | Bang et al. |
| 2009/0094746 A1 | 4/2009 | Ferraresi et al. |
| 2009/0146005 A1 | 6/2009 | Bettell |
| 2012/0117730 A1 | 5/2012 | Lemire et al. |
| 2013/0340170 A1 | 12/2013 | Chinn |
| 2014/0041121 A1 | 2/2014 | Shan |
| 2014/0352068 A1 | 12/2014 | Xu |
| 2015/0028642 A1 | 1/2015 | Evans |
| 2018/0118350 A1 | 5/2018 | Davis et al. |
| 2019/0344894 A1 | 11/2019 | Bang et al. |
| 2020/0154899 A1 | 5/2020 | Brown |

OTHER PUBLICATIONS

Sasan Majic Carpet, https://freshome.com/2011/06/14/sasan-magic-carpet-displays-versatility-and-comfort/ . . . , accessed on May 8, 2018.

Nilo, King Square, Electric Massage Bed, Archiproducts, http://www.archiproducts.com/en/products/nilo/electric-massage-bed-king-square_305875, accessed on May 9, 2018.

Lemi Italian Wellness Equipment, Lemi Amanda 3 Motor Electric Lift for Height, Backrest and Legrest, http://www.essentialkneads.com.sg/product/lemi-amanda-3-motor-electric-lift-height-bac . . . , accessed on May 8, 2019.

Brusaferri, Florencelemi electric massage table / wooden / with storage compartment, http://www.archiexpo.com/prod/lemi-brusaferri/product-63252-1659547.html, accessed on May 8, 2018.

Reverie Bed Reverie Dream Supreme, http://tzface.com/reverie-bed/reverie-bed-reverie-dream-supreme-i-hybrid-mattress-luxury-reverie-dream-supreme-i-hybrid-mattress-split-king-dream-supreme-hybrid-1-base-3-with-curtains-bed-reverie-split-king-adjustable-bed-reviews/, accessed on May 8, 2018.

European Patent Office, Extended European Search Report dated Oct. 7, 2019 re application No. 19173967.1.

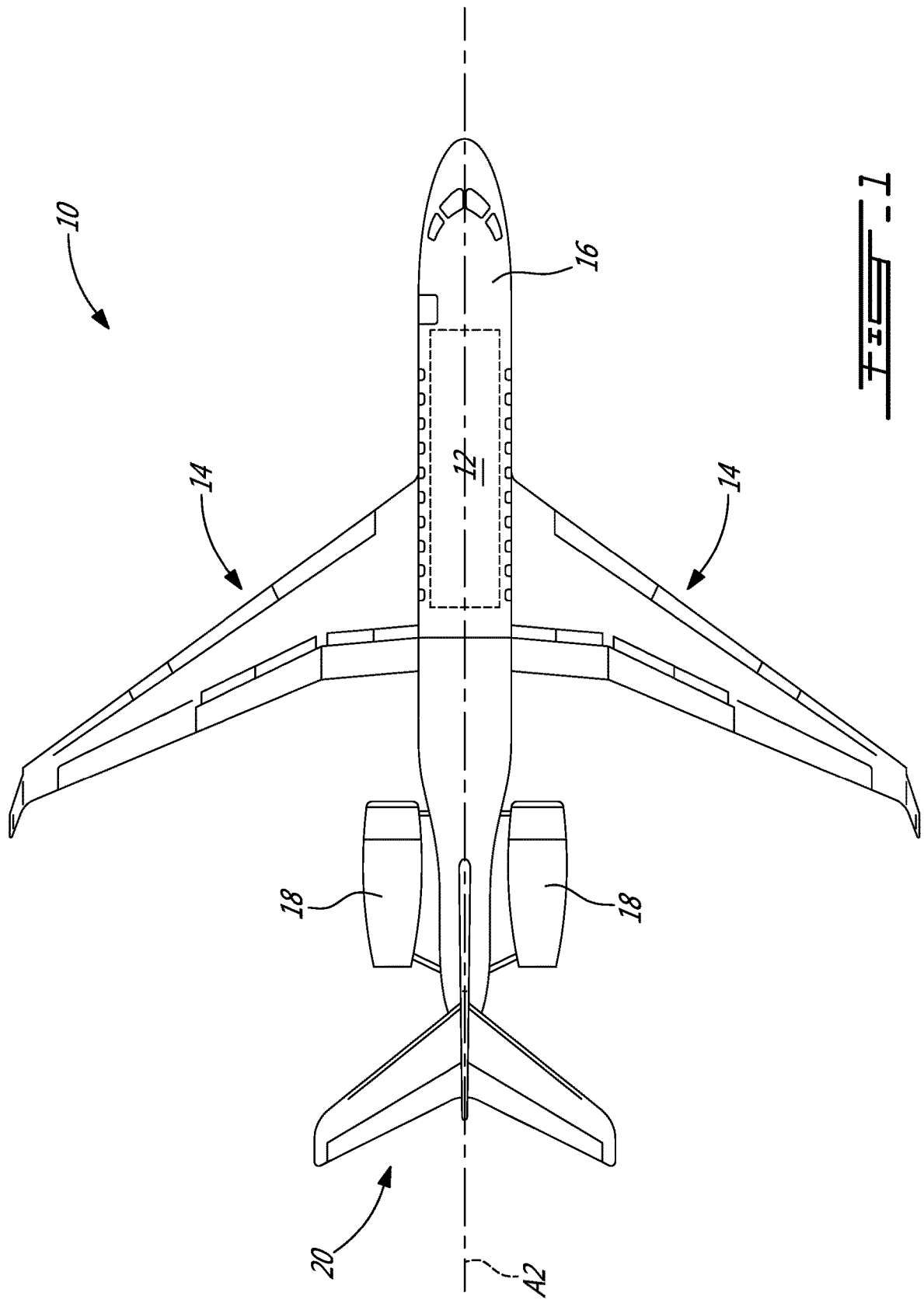

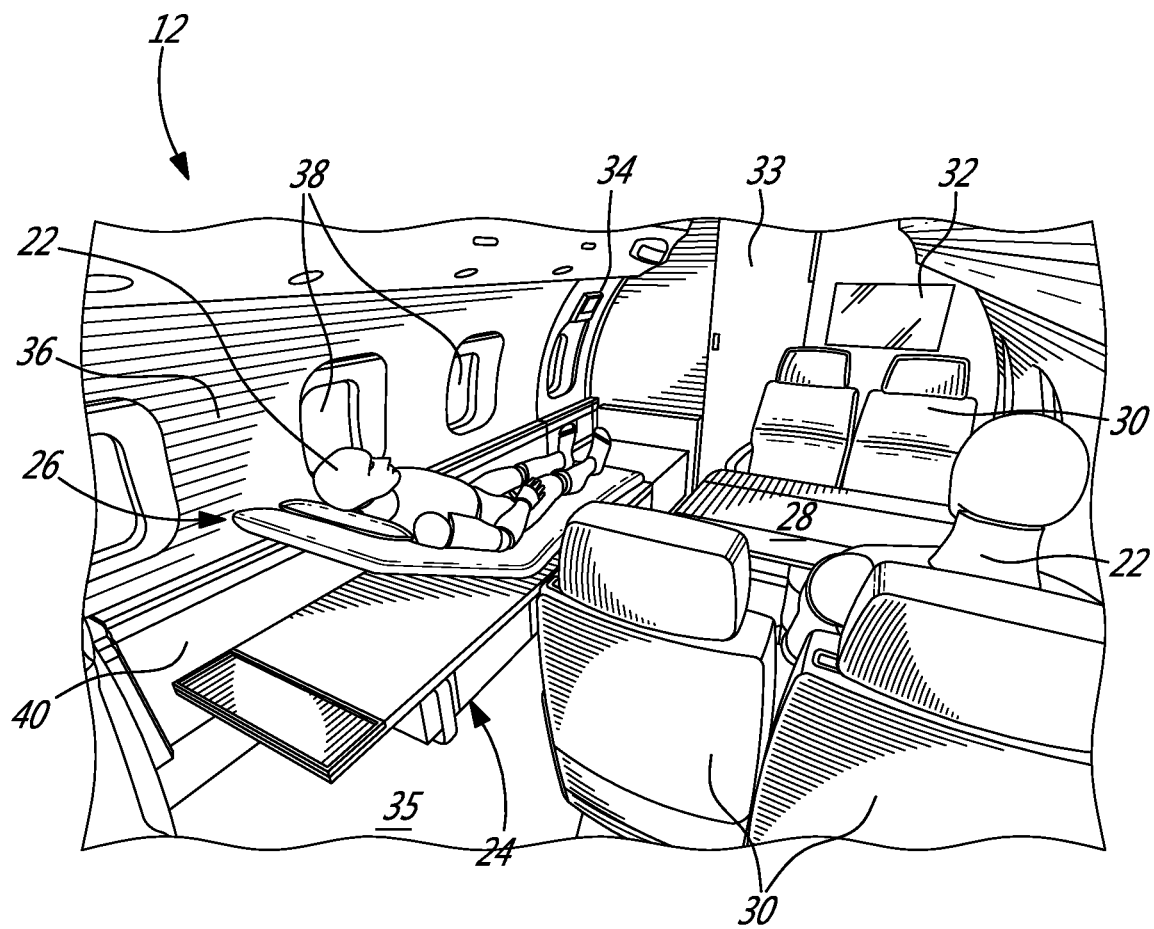

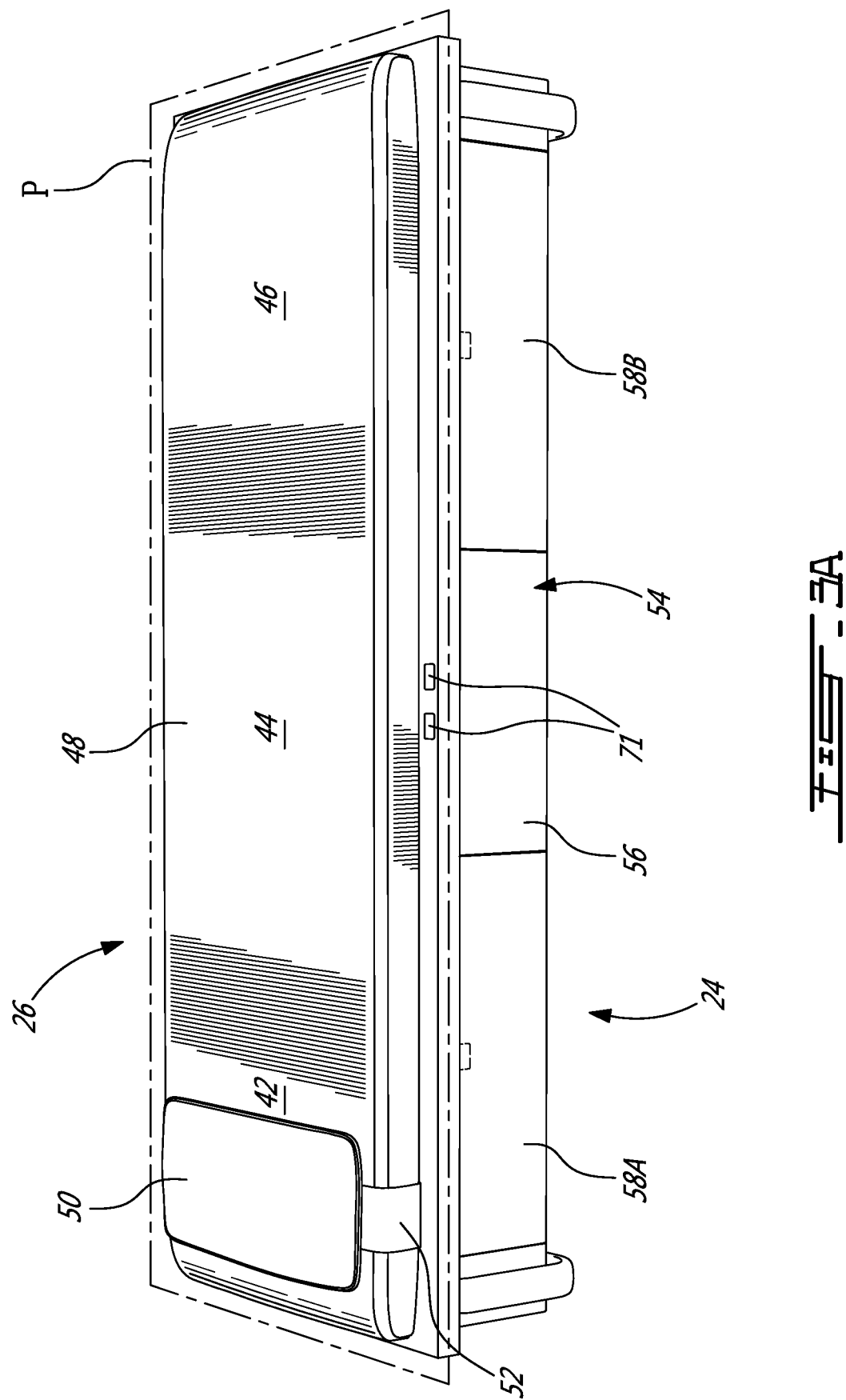

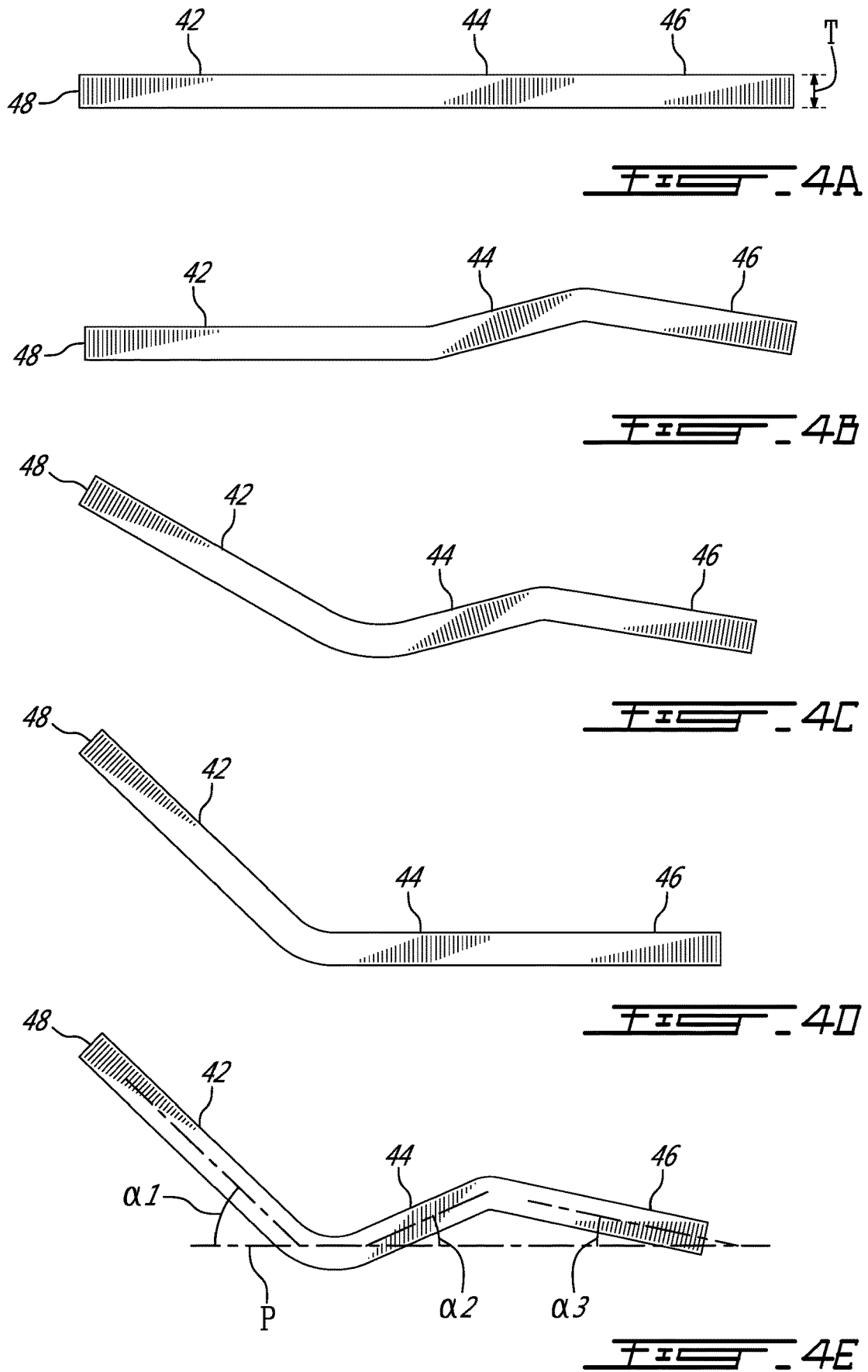

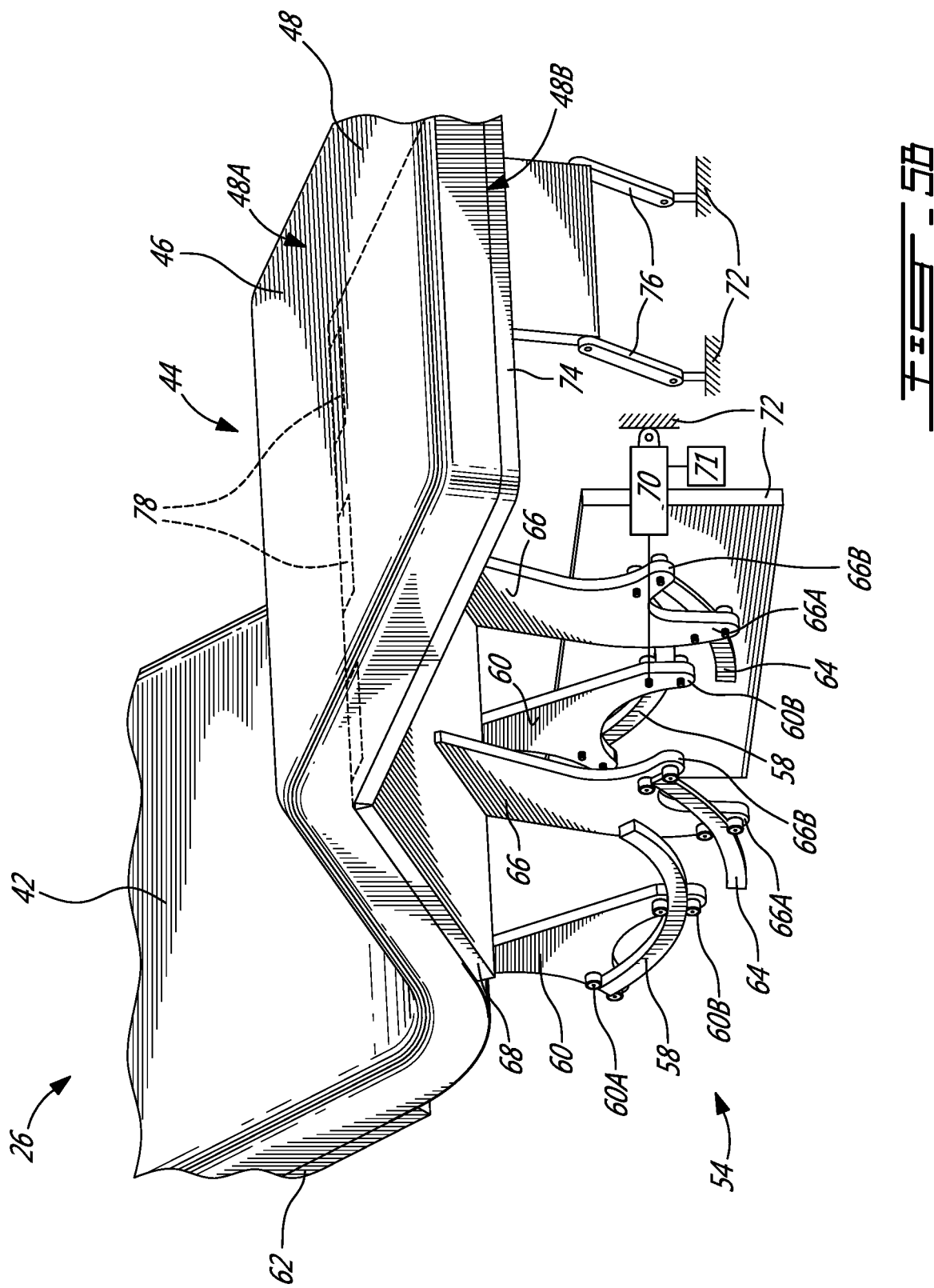

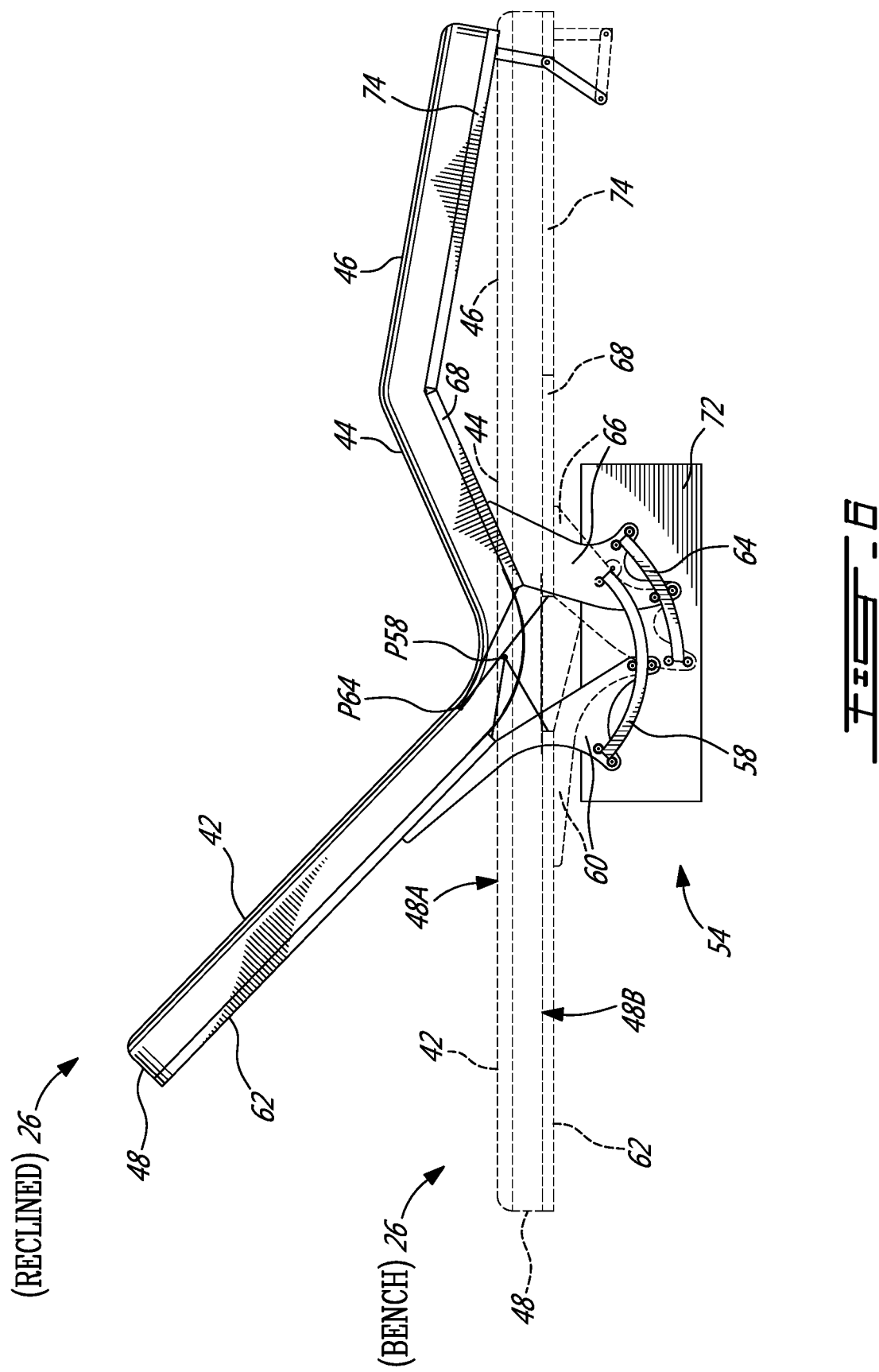

LOUNGE CHAIR FOR AIRCRAFT

CROSS REFERENCE TO RELATED APPLICATIONS AND CLAIM OF PRIORITY

This application is a continuation of U.S. patent application Ser. No. 16/410,363 filed on May 13, 2019, which claims priority to U.S. provisional patent application No. 62/671,106 filed on May 14, 2018, the entire contents of which are hereby incorporated by reference.

TECHNICAL FIELD

The disclosure relates generally to aircraft, and more particularly to aircraft interiors.

BACKGROUND

Cabins of business aircraft can sometimes include a credenza that provides storage capacity. A credenza can occupy a considerable amount of space inside an aircraft cabin. In some situations where the storage capacity provided by the credenza is not fully utilized or is not often utilized, the allocation of such space occupied by the credenza in the aircraft cabin in exchange for the associate storage capacity may not be warranted.

SUMMARY

In one aspect, the disclosure describes an aircraft cabin comprising:
 a credenza; and
 a lounge chair disposed above the credenza, the lounge chair being adjustable between a first configuration defining a first seating arrangement and a second configuration defining a second seating arrangement.

The lounge chair may comprise a backrest portion, a seat portion and a leg rest portion. In the first configuration, the backrest portion, the seat portion and the leg rest portion may cooperatively define a substantially flat bench above the credenza.

In the second configuration, the backrest portion, the seat portion and the leg rest portion may cooperatively define a reclined seating arrangement adapted for a single occupant. In the second configuration, two of the backrest portion, seat portion and leg rest portion may be oriented obliquely to each other.

The lounge chair may comprise a single continuous mattress that defines the backrest portion, the seat portion and the leg rest portion.

The aircraft cabin may comprise a mechanism to facilitate adjustment of the lounge chair. At least part of the mechanism may be disposed inside the credenza.

The credenza may comprise a first storage compartment disposed on a first side of the mechanism, and a second storage compartment disposed on a second side of the mechanism.

The lounge chair may be supported by the credenza.

Embodiments can include combinations of the above features.

In another aspect, the disclosure describes a lounge chair assembly comprising:
 a first occupant support portion;
 a second occupant support portion adjacent the first occupant support portion, the first occupant support portion being angularly adjustable relative to the second occupant support portion;
 a first curved track; and
 a first carriage connected to the first occupant support portion and movably engaged with the first curved track so that movement of the first carriage along the first curved track causes angular adjustment of the first occupant support portion relative to the second occupant support portion.

The first curved track may have a first center of curvature substantially corresponding to a first pivot axis of the first occupant support portion.

The first carriage may comprise two engagement points movably engaging the first curved track at two respective spaced-apart locations along the first curved track.

The lounge chair assembly may comprise a single continuous mattress defining the first occupant support portion and the second occupant support portion.

The second occupant support portion may be angularly adjustable relative to the first occupant support portion and the lounge chair assembly may further comprise:
 a second curved track; and
 a second carriage connected to the second occupant support portion and movably engaged with the second curved track so that movement of the second carriage along the second curved track causes angular adjustment of the second occupant support portion relative to the first occupant support portion.

The first curved track may have a first center of curvature substantially corresponding to a first pivot axis of the first occupant support portion. The second curved track may have a second center of curvature substantially corresponding to a second pivot axis of the second occupant support portion.

The first pivot axis may differ from the second pivot axis.

The lounge chair assembly may comprise a mattress having an upper side and a lower side. The upper side may define the first occupant support portion and the second occupant support portion. The first pivot axis may be located above the lower side of the mattress.

The second pivot axis may be located above the lower side of the mattress.

The first pivot axis may be located between the upper side and the lower side of the mattress.

The first occupant support portion may be disposed above a credenza. The first curved track may be housed by the credenza.

The lounge chair assembly may comprise a single continuous mattress defining the first occupant support portion and the second occupant support portion. The mattress may have an outer covering wherein:
 the curved track may have a first curvature when the outer covering is of a first type; and
 the curved track may have a second curvature different from the first curvature when the outer covering is of a second type different from the first type.

The first and second curvatures of the curved track may correspond to different positions of a neutral axis associated with a bend location of the mattress.

The first and second curvatures of the curved track may correspond to different locations of a pivot axis for the first occupant support portion.

The lounge chair assembly may comprise a single continuous mattress defining the first occupant support portion and the second occupant support portion. The mattress may have an outer covering. The curved track may have a curvature correlated with a property of the outer covering.

The property of the outer covering may be a mechanical property of a material forming the outer covering.

Embodiments can include combinations of the above features.

In a further aspect, the disclosure describes a lounge chair comprising:

a mattress having an upper side and a lower side, the upper side defining a first occupant support portion and a second occupant support portion, the first occupant support portion being adjacent the second occupant support portion;

a first structure supporting the first occupant support portion of the mattress; and a second structure supporting the second occupant support portion of the mattress, the first structure being angularly adjustable relative to the second structure about a first pivot axis, the first pivot axis being located above the lower side of the mattress.

The second structure may be angularly adjustable relative to the first structure about a second pivot axis. The second pivot axis may be located above the lower side of the mattress.

The second pivot axis may be different from the first pivot axis.

The first pivot axis may be located between the upper side and the lower side of the mattress.

The upper side of the mattress may define a third occupant support portion adjacent the second occupant support portion, and, the lounge chair may comprise a third structure supporting the third occupant support portion. The second and third structures may be hingedly connected together.

The first occupant support portion may comprise a backrest portion and the second occupant support portion may comprise a seat portion.

The lounge chair may comprise a bridging support configured to support the mattress at a location between the first and second structures.

The bridging support may comprise a first sheet secured to the first structure and a second sheet secured to the second structure. The first and second sheets may overlap each other and be in sliding engagement with each other.

Embodiments can include combinations of the above features.

In a further aspect, the disclosure describes a method for adjusting a lounge chair comprising a mattress having an upper side and a lower side, the upper side defining a first occupant support portion and a second occupant support portion, the first occupant support portion being adjacent the second occupant support portion. The method comprises:

angularly adjusting a first structure supporting the first occupant support portion of the mattress relative to a second structure supporting the second occupant support portion of the mattress about a first pivot axis, the first pivot axis being located above the lower side of the mattress.

The method may comprise angularly adjusting the second structure relative to the first structure about a second pivot axis. The second pivot axis may be located above the lower side of the mattress. The second pivot axis may be different from the first pivot axis.

The first pivot axis may be located between the upper side and the lower side of the mattress.

A neutral axis at a bend location of the mattress between the first occupant support portion and the second occupant support portion may be located above a centroid of the mattress.

The method may comprise supporting the mattress at a location between the first and second structures.

Embodiments can include combinations of the above features.

In a further aspect, the disclosure describes a method of assembling a lounge chair comprising a mattress with an outer covering and a mechanism to facilitate adjustment of the lounge chair, the mechanism being adaptable based on a property of the outer covering selected for the lounge chair. The method comprises:

adapting the mechanism based on the property of the outer covering;

and assembling the lounge chair using the mechanism adapted based on the property of the outer covering.

The property may be indicative of a resilience of the outer covering.

The property may be indicative of a pliability of the outer covering.

The property may be a mechanical property of the material of the outer covering.

The method may comprise:

receiving a component of the mechanism, a parameter of the component having: a first parameter value when the property of the outer covering has a first property value; and a second parameter value different from the first parameter value when the property of the outer covering has a second property value different from the first property value; and assembling the lounge chair using the component.

The component of the mechanism may be a curved rail and the parameter may be a curvature of the curved rail.

Adapting the mechanism may comprise adjusting a bend radius of the mattress.

Adapting the mechanism may comprise adjusting a location of a pivot axis for a portion of the mattress.

Adapting the mechanism may comprise adjusting a position of a neutral axis associated with a bend location of the mattress.

The method may comprise:

raising the position of the neutral axis when the property of the outer covering is indicative of a first resilience; and lowering the position of the neutral axis when the property of the outer covering is indicative of a second resilience higher than the first resilience.

The method may comprise adapting the mechanism based on a thickness of the mattress.

Embodiments can include combinations of the above features.

In a further aspect, the disclosure describes an aircraft comprising a cabin as disclosed herein.

In a further aspect, the disclosure describes an aircraft comprising a lounge chair assembly as disclosed herein.

In a further aspect, the disclosure describes an aircraft comprising a lounge chair as disclosed herein.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a top plan view of an exemplary aircraft comprising a cabin as disclosed herein;

FIG. 2B is a perspective view of the interior of the cabin of FIG. 2A including the lounge chair in a reclined configuration;

FIG. 3A is a perspective view of the lounge chair of FIG. 2A in a bench configuration;

FIGS. 4A-4E illustrate schematic side profiles of a mattress of the lounge chair of FIGS. 3A and 3B in different respective configurations;

FIG. 5B is a perspective view of the mechanism of FIG. 5A shown in a state corresponding to a reclined configuration of the lounge chair;

FIG. 6 is a side elevation view of the lounge chair of FIGS. 3A and 3B simultaneously showing of the bench and reclined configurations of the lounge chair in a superimposed manner;

DETAILED DESCRIPTION

Figure 2A:
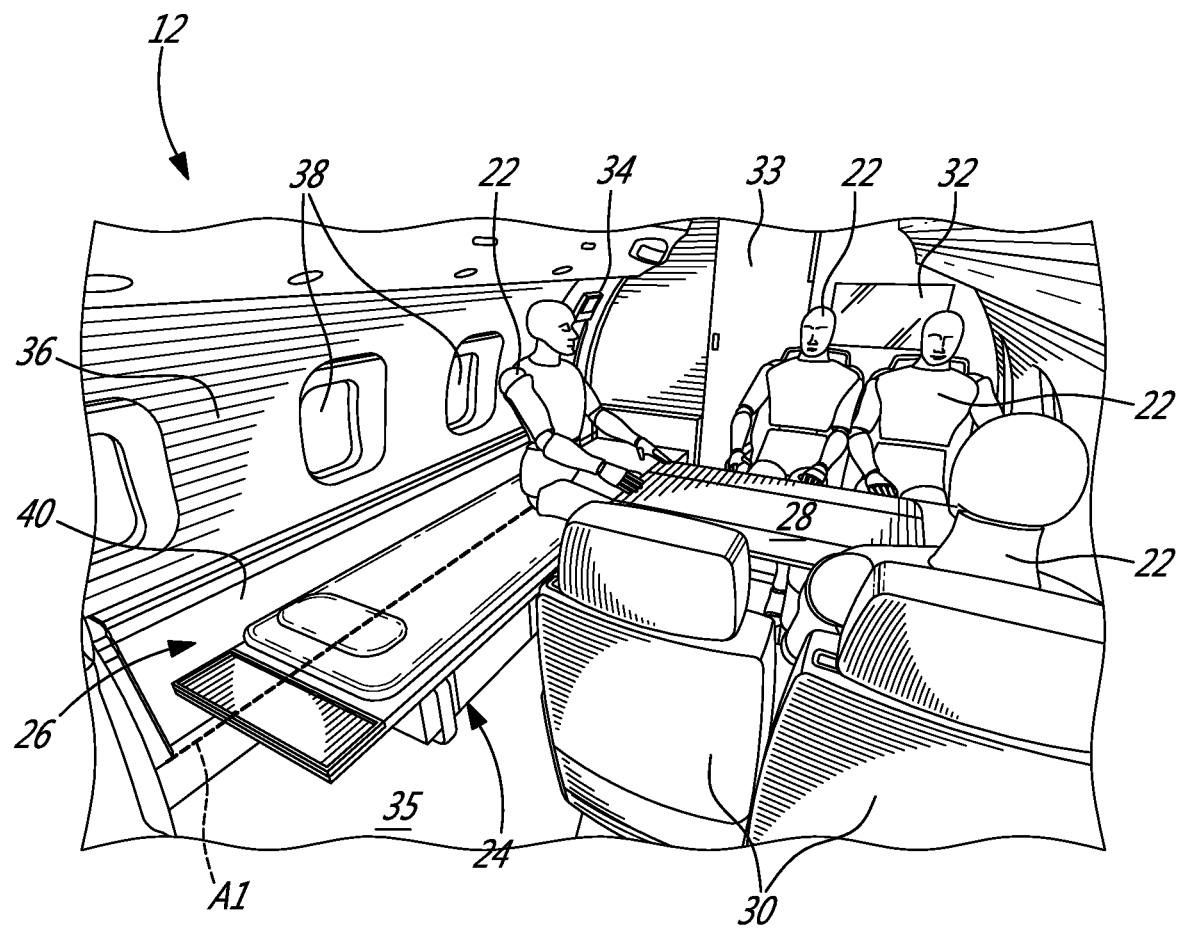
FIG. 2A is a perspective view of an exemplary interior configuration of the cabin of the aircraft of FIG. 1 including an exemplary lounge chair in a bench configuration.

The following disclosure relates to lounge chairs and aircraft cabin configurations that make efficient use of space inside aircraft cabins. In one aspect, the following disclosure relates to an aircraft cabin that includes a credenza and a lounge chair disposed above the credenza. The lounge chair can be adjustable between a first configuration defining a first seating arrangement (e.g., multi-occupant bench) and a second configuration defining a second seating arrangement (e.g., single occupant recliner). In some embodiments, such aircraft cabin arrangement can promote efficient use of space inside the aircraft cabin by providing seating capacity at the location of the credenza. In some embodiments, such aircraft cabin arrangement can provide versatility in accommodating a variable number of passengers and customer preferences.

In another aspect, the following disclosure relates to a mechanism configured to facilitate the adjustment of the lounge chair between the first configuration and the second configuration. In some embodiments, the mechanism disclosed can be adapted to obtain a desired bending behavior of a mattress of the lounge chair based on a material type (e.g., fabric, leather) of an outer covering of the mattress to reduce wrinkling of the outer covering for example. In some embodiments, reducing wrinkling of the outer covering of the mattress can improve the appearance of the lounge chair and increase the useful life of the outer covering by reducing damage to the material of the outer covering that can occur by repeated wrinkling and straightening of the outer covering when adjusting the lounge chair.

Aspects of various embodiments are described through reference to the drawings.

FIG. 1 is a top plan view of an exemplary aircraft 10, which comprises (e.g., passenger) cabin 12 as described herein. Aircraft 10 can be any type of aircraft such as corporate (e.g., business jet), private, commercial and passenger aircraft suitable for civil aviation. For example, aircraft 10 can be a narrow-body, twin-engine jet airliner or can be an ultra-long range business jet. Aircraft 10 can be a fixed-wing aircraft. Aircraft 10 can comprise wings 14, fuselage 16, one or more engines 18 and empennage 20.

FIGS. 2A and 2B show an exemplary interior configuration of cabin 12 of aircraft 10. Cabin 12 can be configured to receive passengers 22 therein during operation (e.g., flight) of aircraft 10. In various embodiments, cabin 12 can include credenza 24 and lounge chair 26. FIG. 2A shows lounge chair 26 in a first configuration defining a first seating arrangement and FIG. 2B shows lounge chair 26 in a second configuration defining a second seating arrangement. In some embodiments, cabin 12 can include other pieces of furniture such as table 28 and passenger seats 30. In some embodiments, cabin 12 can include passenger entertainment equipment such as television 32 for example. Cabin 12 can be comprise cockpit door 33 for accessing a cockpit of aircraft 10 and also exterior door 34.

Credenza 24 can comprise a closed cabinet providing storage capacity for various items. Credenza 24 can have a style that matches other furniture inside of cabin 12. Credenza 24 can have an overall height that is about the same or that is lower than a height of an upper surface of table 28 from floor 35. In some embodiments, credenza 24 could be higher than the upper surface of table 28 from floor 35. In some embodiments, a top surface of credenza 24 can be about 15 inches (38 cm) from floor 35 for example. Credenza 24 can be positioned near or against wall 36 of cabin 12. Wall 36 of cabin 12 can comprise one or more windows 38 and door(s) 34 to the exterior of aircraft 10. In some embodiments, credenza 24 can be positioned near or against side ledge 40.

Lounge chair 26 can be disposed above credenza 24 so as to provide seating capacity on top of credenza 24 and thereby make more efficient use of the floor space inside of cabin 12 that is occupied by credenza 24. In some embodiments, lounge chair 26 can be of a type referred to as "chaise lounge" or "chaise longue". In some embodiments, lounge chair 26 can be an upholstered chair that is long enough to support the legs of an occupant and that permits a lounging (e.g., recumbent) position of the occupant. Accordingly, lounge chair 26 can have an elongated shape where longitudinal axis A1 of lounge chair 26 is generally aligned to be substantially parallel to a wall (e.g., cabin wall 36) inside of cabin 12. In some embodiments, lounge chair 26 can be positioned so that longitudinal axis A1 of lounge chair 26 is substantially parallel to longitudinal axis A2 of cabin 12, or fuselage 16 and/or of aircraft 10.

The location of lounge chair 26 above credenza 24 can permit the presence of the storage capacity provided by credenza 24 while also providing additional seating capacity above credenza 24 and around table 28 for example. Lounge chair 26 can be adjustable (e.g., articulated) between a first configuration defining a first (e.g., flat, bench) seating arrangement as shown in FIG. 2A, and, a second configuration defining a second (e.g., reclined, lounging) seating arrangement as shown in FIG. 2B. The bench seating arrangement shown in FIG. 2A can provide an elongated and substantially flat seating surface that can accommodate a plurality of (e.g., two, three or more) passengers 22 (i.e., occupants) sitting side by side along the elongated seating surface provided by lounge chair 26. The configuration of lounge chair 26 shown in FIG. 2A can be suitable for accommodating situations of higher occupancy inside cabin 12. The bench seating arrangement can also permit a single occupant to lay down so that the bench configuration can also serve as a day bed for example.

The reclined seating arrangement shown in FIG. 2B can define a reclined seating arrangement that is adapted for a single occupant in a reclining/lounging position. The configuration of lounge chair 26 shown in FIG. 2B can provide passenger comfort while accommodating situations of lower occupancy inside cabin 12.

Figure 3B:
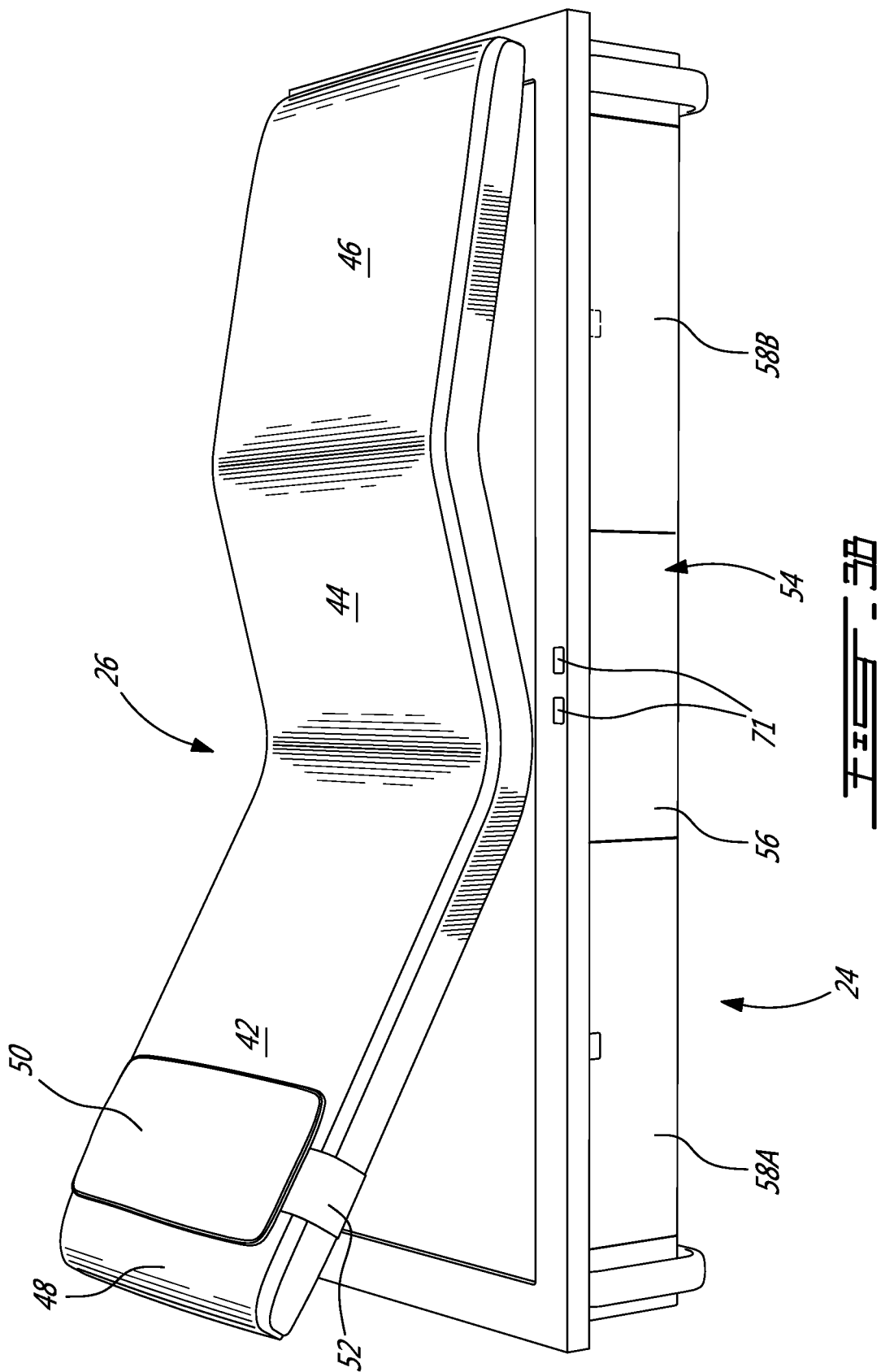
FIG. 3B is a perspective view of the lounge chair of FIG. 2A in a reclined configuration.

FIGS. 3A and 3B show lounge chair 26 in a bench configuration and in a reclined configuration respectively. Lounge chair 26 can comprises a plurality of occupant support portions such as, for example, backrest portion 42, seat portion 44 and leg rest portion 46. Seat portion 44 can be disposed between backrest portion 42 and leg rest portion 46. For example, seat portion 44 can be adjacent backrest portion 42. Leg rest portion 46 can be adjacent seat portion 44. Two or more of the occupant support portions of lounge chair 26 can be defined by a single mattress 48 that extends continuously across the occupant support portions. For example, mattress 48 can be free of discontinuities (e.g., interruptions or cut-outs) between two adjacent occupant support portions.

In some embodiments, backrest portion 42, seat portion 44 and leg rest portion 46 can be defined by a single continuous mattress 48 that is sufficiently pliable (e.g., bendable, foldable) to achieve the configurations shown in FIGS. 3A and 3B. The construction of mattress 48 can be selected to provide suitable cushioning and comfort to one or more occupants. Mattress 48 can comprise a cushioned top surface and outer covering (upholstery material) for interfacing with and providing comfortable seating to the one or more occupants. For example, mattress 48 can comprise a foam core that is at least partially enveloped by the outer covering. Such outer covering (see reference numeral 80 in FIG. 7) can comprise a suitable fabric or leather for example. In various embodiments, the material of the outer covering can be selected to have properties (e.g., pliability, resilience) that can accommodate and withstand the repeated bending and flattening of mattress 48 when mattress 48 is adjusted between the bench and reclined configurations shown in FIGS. 3A and 3B respectively for example. In some embodiments, lounge chair 26 can comprise pillow 50 secured to mattress 48 via strap 52 or otherwise. Pillow 50 can be movable along mattress 48 to accommodate an occupant's preference.

In the bench configuration shown in FIG. 3A, backrest portion 42, seat portion 44 and leg rest portion 46 can cooperatively define a substantially flat bench disposed above credenza 24. In other words, backrest portion 42, seat portion 44 and leg rest portion 46 can cooperatively define a substantially flat seating surface lying generally in plane P which can be substantially parallel to floor 35 of cabin 12.

In the reclined configuration shown in FIG. 3B, backrest portion 42, seat portion 44 and leg rest portion 46 can cooperatively define a reclined seating arrangement adapted for a single occupant. For example, one or more of backrest portion 42, seat portion 44 and leg rest portion 46 can be oriented obliquely relative to plane P. In other words, two of backrest portion 42, seat portion 44 and leg rest portion 46 can be oriented obliquely relative to each other. In reference to FIG. 3B and to passenger 22 lounging in lounge chair 26 in FIG. 2B, backrest portion 42 can be configured to support a back area of an occupant, seat portion 44 can be configured to support a seat and thigh area (above the knee) of an occupant and leg rest portion 46 can be configured to support lower legs (below the knee) and feet of an occupant. In some embodiments, an overall length of mattress 48 along longitudinal axis A1 can be about 80 inches (203 cm) where a length of backrest portion 42 can be about 36 inches (91 cm), a length of seat portion 44 can be about 20 inches (51 cm) and a length of leg rest portion 46 can be about 24 inches (61 cm) for example. In some embodiments, mattress 38 can have a thickness T (see FIG. 4A) of about 3.5 inches (9 cm).

Lounge chair 26 can comprise mechanism 54 (shown in FIGS. 5A and 5B) configured to facilitate adjustment of lounge chair 26. In various embodiments, mechanism 54 can be configured to guide the movement of backrest portion 42, seat portion 44 and/or leg rest portion 46. In some embodiments, at least part of mechanism 54 can be disposed in credenza 24. For example, part of mechanism 54 can be housed inside mechanism storage compartment 56 defined by credenza 24. In some embodiments, credenza 24 can comprise one or more other storage compartments 58A, 58B (e.g., cabinets) adjacent mechanism storage compartment 56. Other storage compartments 58A, 58B can be accessible to passengers 22 of aircraft 10 via suitable doors or drawers for example. Credenza 24 can comprise other storage compartment 58A disposed on a first (e.g., left) side of mechanism storage compartment 56, and, other storage compartment 58B disposed on a second (e.g., right) side of mechanism storage compartment 56.

FIGS. 4A-4E illustrate schematic side profiles of mattress 48 of lounge chair 26 of FIGS. 3A and 3B in different respective configurations of lounge chair 26. For example, FIG. 4A shows a side profile of mattress 48 when lounge chair 26 is in the bench configuration as shown in FIG. 3A. FIG. 4E shows a side profile of mattress 48 when lounge chair 26 is in the reclined configuration as shown in FIG. 3B. FIGS. 4B-4D can respectively be representative of other different configurations that can be achieved by lounge chair 26 in some embodiments. For example, FIGS. 4B-4D can represent intermediate configurations of lounge chair 26 that can be achieved between the bench configuration of FIG. 4A and the reclined configuration of FIG. 4E. In some embodiments, lounge chair 26 can be configured to selectively adopt two or more of the configurations illustrated in FIGS. 4A-4E for example. In various configurations of lounge chair 26, an angle of inclination $\alpha 1$ between backrest portion 42 and plane P can be between 0° and 45° for example, an angle of inclination $\alpha 2$ between seat portion 44 and plane P can be between 0° and 25° for example, and, an angle of inclination $\alpha 3$ between leg rest portion 46 and plane P can be between 0° and 12° for example.

Figure 5A:
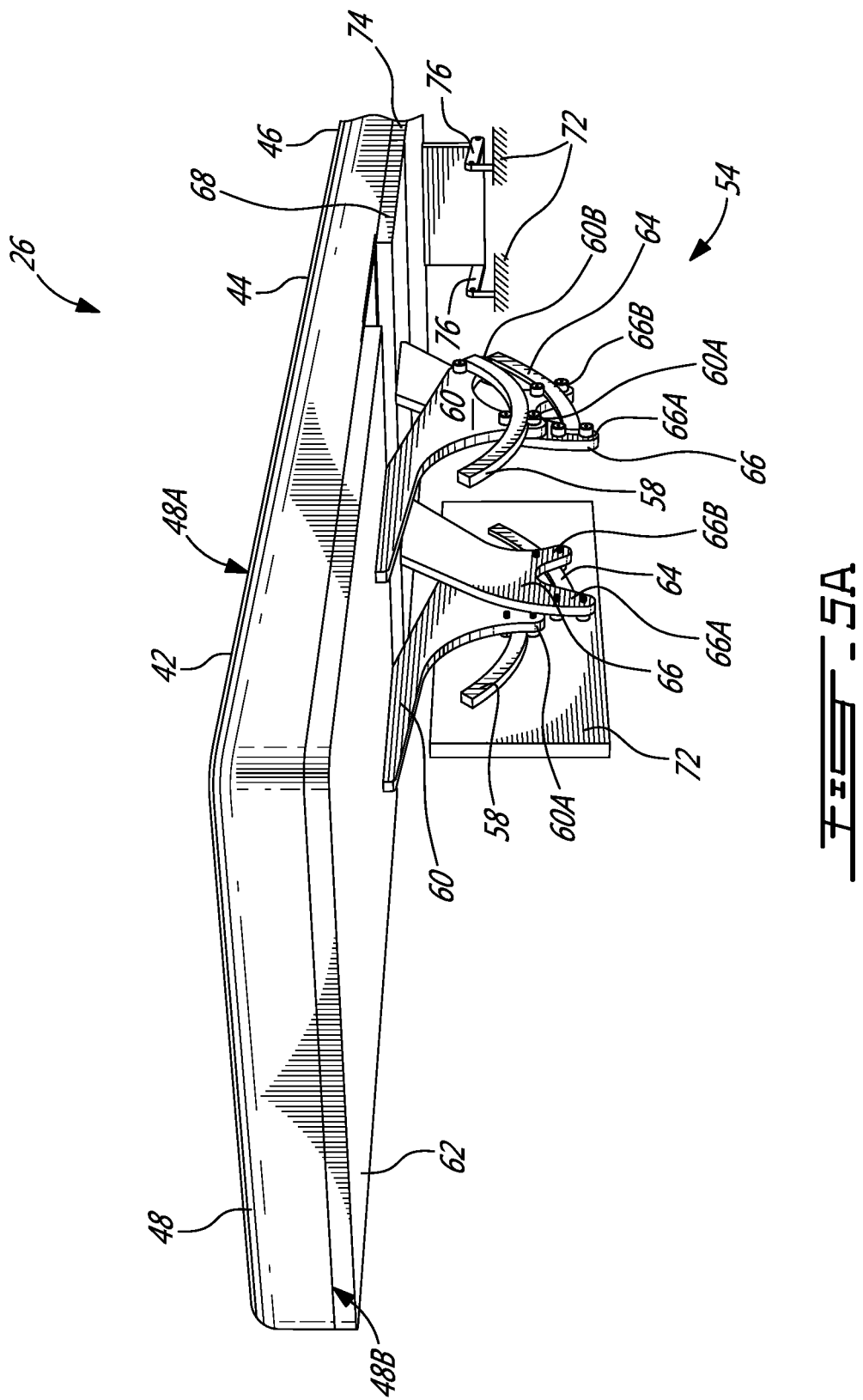
FIG. 5A is a perspective view of an exemplary mechanism to facilitate the adjustment of the lounge chair of FIGS. 3A and 3B, the mechanism being shown in a state corresponding to a bench configuration of the lounge chair.

FIGS. 5A and 5B show an exemplary mechanism 54 to facilitate the adjustment of lounge chair 26. FIG. 5A shows mechanism 54 in a state corresponding to lounge chair 26 being in the bench configuration of FIG. 3A and FIG. 5B shows mechanism 54 in a state corresponding to lounge chair 26 being in the reclined configuration of FIG. 3B. Mechanism 54 can be adaptable based on one or more properties of mattress 48. For example, mechanism 54 can be adaptable based on one or more properties of the outer covering of mattress 48. In some embodiments, mechanism 54 can be adapted based on a property that is indicative of a resilience of the material forming the outer covering. In some embodiments, mechanism 54 can be adapted based on a property that is indicative of a pliability of the material forming the outer covering. In some embodiments, mechanism 54 can be adapted based on one or more mechanical properties (e.g., tensile, shear, compressional, stiffness, extensibility, flexibility, pliability, resilience) of the material forming the outer covering. It is understood that mechanism 54 can be adapted based on other factors such as thickness T and the firmness of mattress 48.

The adaptation of mechanism 54 can be used to improve the aesthetics of the outer covering of mattress 48 during adjustment of lounge chair 26 (i.e., bending of mattress 48) by reducing the amount of wrinkling of the outer covering (e.g., fabric, leather) of mattress 48. Reducing the amount of wrinkling can consequently increase the life of the outer covering by reducing damage (e.g., cracking) to the material of the outer covering that could occur by repeated wrinkling and straightening of the outer covering when adjusting lounge chair 26.

In some embodiments, a single (i.e., best compromise) adaptation of mechanism 54 can be selected to accommodate a wide range of properties of the material of the outer covering. Alternatively, as explained below, two or more different adaptations of mechanism 54 can be made available for assembly in lounge chair 26 where such different adaptations are tailored for different respective properties or ranges of properties of the material(s) forming the outer covering of mattress 48. Accordingly, different adaptations of mechanism 54 can be used for different materials selected for the outer covering of mattress 48.

In reference to FIGS. 5A and 5B, mechanism 54 can comprise one or more first curved tracks 58 (referred hereinafter in the singular) associated with backrest portion 42. First curved track 58 can define and guide the movement of backrest portion 42 during angular adjustment of backrest portion 42. Mechanism 54 can include one or more first carriages 60 (referred hereinafter in the singular) connected to backrest portion 42 via backrest platform 62 for example. First carriage 60 can be fixedly connected to backrest platform 62 via one or more suitable fasteners for example. Backrest platform 62 can serve as a rigid structure supporting backrest portion 42 of mattress 48. Backrest platform 62 can be separate from mattress 48 or can be integral to mattress 48. First carriage 60 can be movably engaged with first curved track 58 so that movement of first carriage 60 along first curved track 58 causes angular adjustment of backrest portion 42 relative to seat portion 44. First carriage 60 can comprise two engagement points 60A, 60B movably engaging first curved track 58 at two respective spaced-apart locations along first curved track 58. Engagement points 60A, 60B can each include one or more rollers for engaging with first curved track 58.

Mechanism 54 can comprise one or more second curved tracks 64 (referred hereinafter in the singular) associated with seat portion 44. Second curved track 64 can define and guide the movement of seat portion 44 during angular adjustment of seat portion 44. Mechanism 54 can include one or more second carriages 66 (referred hereinafter in the singular) connected to seat portion 44 via seat platform 68. Second carriage 66 can be fixedly connected to seat platform 68 via one or more suitable fasteners for example. Seat platform 68 can serve as a rigid structure supporting seat portion 44 of mattress 48. Seat platform 68 can be separate from mattress 48 or can be integral to mattress 48. Second carriage 66 can be movably engaged with second curved track 64 so that movement of second carriage 66 along second curved track 64 causes angular adjustment of seat portion 44 relative to backrest portion 42. Second carriage 66 can comprise two engagement points 66A, 66B movably engaging second curved track 64 at two respective spaced-apart locations along second curved track 64. Engagement points 60A, 60B can each include one or more rollers for engaging with first curved track 58.

One or more actuators 70 (referred hereinafter in the singular) can be provided to actuate first carriage 60 along first curved track 58. Similarly, one or more actuators (not shown) can be provided to actuate second carriage 66 along second curved track 64. Actuator 70 can be of any suitable type including but not limited to electric, pneumatic and hydraulic for example. In some embodiments, actuator 70 can be a manually actuatable and resiliently biased pneumatic actuator of the type commonly used for adjusting office chairs for example. In some embodiments, actuator 70 can be configured to be stopped and locked at intermediate positions in order to achieve different configurations of lounge chair 26 illustrated in FIGS. 4A-4E for example. For example, actuator 70 can be resiliently biased to cause raising of backrest portion 42 when a brake is released. Accordingly, backrest portion 42 can be raised by releasing the brake and removing occupant weight from backrest portion 42. Conversely, backrest portion 42 can be lowered by releasing the brake and applying occupant weight on backrest portion 42. The application/release of the brake can be achieve by suitable switch, button or lever 71 actuatable by the occupant.

Actuator 70 can be connected to first carriage 60 and to fixed support structure 72 so that an actuation force generated by actuator 70 can cause movement of first carriage 60 relative to support structure 72. First curved track 58 and second curved track 64 can be secured to support structure 72. In some embodiments, support structure 72 can be part of credenza 24. Accordingly, lounge chair 26 can be supported by part of credenza 24 via carriages 60, 66 and curved tracks 58 and 64 so that a load path from mattress 48 to floor 35 can pass through part of credenza 24.

Lounge chair 26 can comprise leg rest platform 74 that can serve as a rigid structure supporting leg rest portion 46 of mattress 48. Leg rest platform 74 can be separate from mattress 48 or can be integral to mattress 48. An end of leg rest platform 74 that is distal from seat portion 44 can be connected to support structure 72 via one or more links 76. Another end of leg rest platform 74 that is proximal to seat portion 44 can be hingedly connected to seat platform 68 via one or more (e.g., piano) hinges 78 for example.

FIG. 6 simultaneously shows two superimposed lounge chairs 26 in the bench and reclined configurations respectively. First curved track 58 can have a first center of curvature (e.g., in a vertical plane) substantially corresponding to pivot axis P58 of backrest portion 42. Similarly, second curved track 64 can have a second center of curvature (e.g., in a vertical plane) substantially corresponding to pivot axis P64 of seat portion 44. As shown in FIG. 6, pivot axes P58 and P64 can differ from each other. For example, pivot axes P58 and P64 can be located at different positions and can be non-coaxial. In some embodiments, pivot axes P58 and P64 can be substantially parallel.

In various embodiments curved tracks 58, 64 may not necessarily be perfectly or completely arcuate so the location(s) of one or both pivot axes P58 and P64 can vary within the range of motion of respective backrest portion 42 or seat portion 44. In some embodiments, curved tracks 58 and/or 64 can be configured so that backrest portion 42 and/or seat portion 44 undergo a combination of rotational and translational movements throughout their respective ranges of motion. In some embodiments, curved tracks 58 and/or 64 can be configured so that backrest portion 42 and/or seat portion 44 undergo only rotational movement throughout their respective ranges of motion. Curved tracks 58 and/or 64 can each have one or more generally arcuate portions.

As mentioned above, mechanism 54 can be adapted based on one or more properties of the material forming the outer covering of mattress 48 in order to improve aesthetics or the life of the outer covering. In some embodiments of mechanism 54, such adaptation can be achieved by the selection and positioning of one or more curved tracks 58 and/or 64.

The (e.g., radius of) curvature(s) of curved tracks 58 and/or 64 can be selected based on (e.g., correlated with) one or more properties of the outer covering or of mattress 48 in order to achieve a desired bending behavior of mattress 48. For example, curved tracks 58 and/or 64 of different curvatures associated with different material types or properties of the outer cover or of mattress 48 can be incorporated into mechanism 54 to obtain a desired bending behaviour of mattress 48.

In reference to FIG. 6, a larger radius of curvature of first curved track 58 would result in a higher first pivot axis P58 for backrest portion 42, and, a smaller radius of curvature of first curved track 58 would result in a lower pivot axis P58 for backrest portion 42. It is understood that a similar effect on pivot axis P64 can also be achieved by varying a curvature of second curved track 64.

The ability to change the locations of pivot axis P58 and/or P64 by way of adaptation of mechanism 54, allows the bending behavior of mattress 48 to be tailored based on the outer cover selected. For example, the selection of different curvatures for curved tracks 58 and/or 64 can be used to correspondingly obtain different bend radii or locations of a neutral axis associated with mattress 48. For example, the location of pivot axis P58 can be associated with a corresponding bend radius R (see FIG. 7) of mattress 48. The locations of pivot axis P58 can be associated with a corresponding location of the neutral axis (see FIG. 7) associated with (e.g., within) mattress 48.

Mattress 48 can have upper side 48A and lower side 48B where upper side 48A defines the occupant support portions (e.g., backrest portion 42, seat portion 44 and leg rest portion 46). In some embodiments, lower side 48B of mattress 48 can interface with and be supported by platforms 62, 68 and 74. In some embodiments, pivot axis P58 can be located above lower side 48B of mattress 48. In some embodiments, pivot axis P64 can be located above lower side 48B of mattress 48. In some embodiments, pivot axis P58 can be located between upper side 48A and lower side 48B of mattress 48. In some embodiments, pivot axis P64 can be located between upper side 48A and lower side 48B of mattress 48. In some embodiments, pivot axis P58 and/or pivot axis P64 can be located above upper side 48A of mattress 48.

Figure 7:
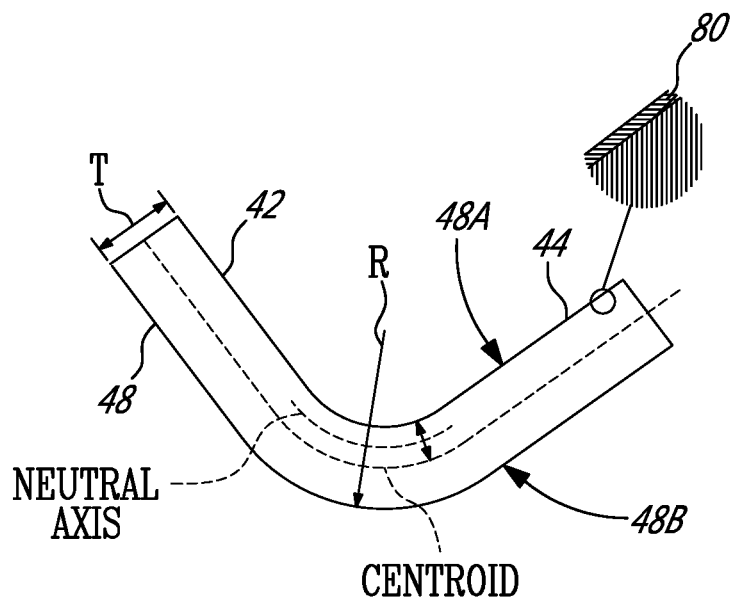
FIG. 7 is a schematic side view of an exemplary bend location of the mattress of the lounge chair of FIGS. 3A and 3B.

FIG. 7 schematically shows an exemplary bend location of mattress 48 of lounge chair 26. The situation illustrated in FIG. 7 corresponds to a bend location between back rest portion 42 and seat portion 44 when lounge chair 26 is in the reclined configuration. FIG. 7 also schematically shows an enlarged cross-sectional portion of mattress 48 to show outer cover 80 of mattress 48.

FIG. 7 shows an exemplary position of a neutral axis which can be varied (i.e., raised or lowered relative to the centroid) by suitable adaptation of mechanism 54 as explained above. Neutral axis 54 can correspond to an axis in the cross section of mattress 48 along which there are no longitudinal stresses or strains. In the situation illustrated in FIG. 7 for example, the volume of mattress 48 located above the neutral axis would be subjected to compressive stress and strain, and, the volume of mattress 48 located below the neutral axis would be subjected to tensile stress and strain. It is understood that the magnitude of the stress and strain in mattress 48 can increase with increased distance from the neutral axis. Accordingly, the magnitude of compressive stress and strain at upper side 48A of mattress 48 and the magnitude of tensile stress and strain at lower side 48B can be controlled to some extent by raising/lowering the neutral axis and/or changing the magnitude of bend radius R by way of adaptation of mechanism 54.

One or more properties of outer cover 80 can be taken into consideration when adapting mechanism 54 in order to obtain desirable stresses and strains at upper side 48A and lower side 48B of mattress 48. In other words, mechanism 54 can be adapted (e.g., by way of component selection and/or positioning) to raise or lower the position of the neutral axis at the bend location as a function of one or more properties of outer cover 80. For example, in the case of outer covering 80 being a relatively thin flexible and highly resilient fabric, it could be desirable to adapt mechanism 54 so that the neutral axis is midway between upper side 48A and lower side 48B of mattress 48 so that the stresses in the fabric on upper side 48A and lower side are of substantially equal but of opposite signs. Conversely, in the case of outer event of outer covering 80 being a relatively thick and rigid leather, it could be desirable to adapt mechanism 54 so that the neutral axis is closer to upper side 48A than of lower side 48B of mattress 48 in order to prevent excessive wrinkling of the leather on upper side 48A of mattress 48. It is understood that other factors such as thickness T and the firmness of mattress 48 can also be taken into consideration when adapting mechanism 54. In some situations where the thickness T of mattress 48 is about 3.5 inches (9 cm), a bend radius R of about 10 inches (25 cm) at outer side 48B of mattress 48 can be suitable.

Figure 8:
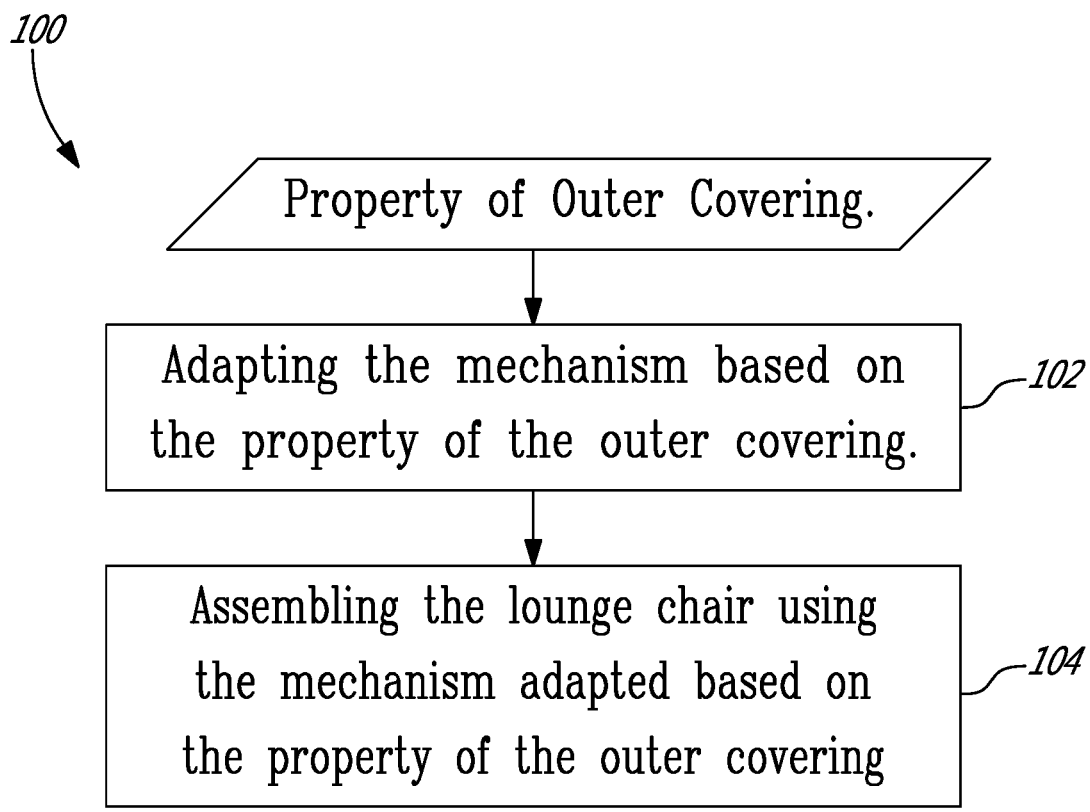
FIG. 8 is a flowchart of a method for assembling a lounge chair.

FIG. 8 is a flowchart of a method 100 of assembling lounge chair 26 as described herein wherein lounge chair 26 comprises mattress 48 with outer covering 80 and mechanism 54 to facilitate adjustment of lounge chair 26. Mechanism 54 can be adaptable based on one or more properties of outer covering 80 and/or of mattress 48 selected for lounge chair 26. Method 100 can comprise:

adapting mechanism 54 based on the property of outer covering 80 (see block 102); and assembling lounge chair 26 using mechanism 54 adapted based on the property of outer covering 80 (see block 104).

In various embodiments of method 100, the property of outer covering 80 can be indicative of a resilience and/or of a pliability of outer covering 80. The property can be a mechanical property of the material of outer covering 80.

Method 100 can comprise receiving a component of mechanism 54 where a parameter of the component is selected based on the selected outer covering 80. For example, a parameter of the component can have a first parameter value when the property of outer covering 80 has a first property value, and, a second parameter value different from the first parameter when the property of outer covering 80 has a second property value different from the first property value. Lounge chair 26 can be assembled using the applicable component. The component of mechanism 54 can be curved rail 58, 64 and the parameter can be a curvature of curved rail 58, 64.

Adapting mechanism 54 can comprise adjusting bend radius R of the mattress 48. Adapting mechanism 54 can comprise adjusting a location of pivot axis P58, P64 for a portion of mattress 48. 11. Mechanism 54 can also be adapted based on thickness T and/or other property(ies) of mattress 48.

Adapting mechanism 54 can comprise adjusting a position of a neutral axis associated with a bend location of mattress 48. For example, the position of the neutral axis can be raised when the property of outer covering 80 is indicative of a first resilience; and the position of the neutral axis can be lowered when the property of outer covering 80 is indicative of a second resilience higher than the first resilience.

Figure 9A:
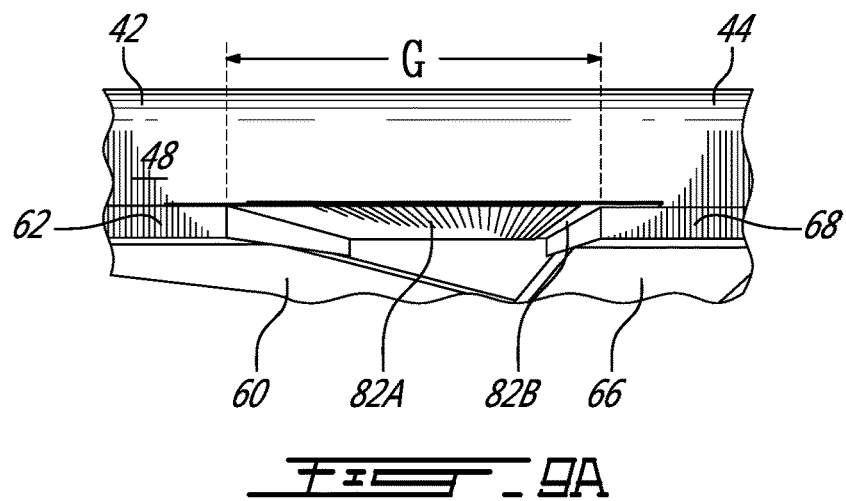
FIG. 9A is a perspective view of the bend location of the mattress when the lounge chair is in the bench configuration.
Figure 9B:
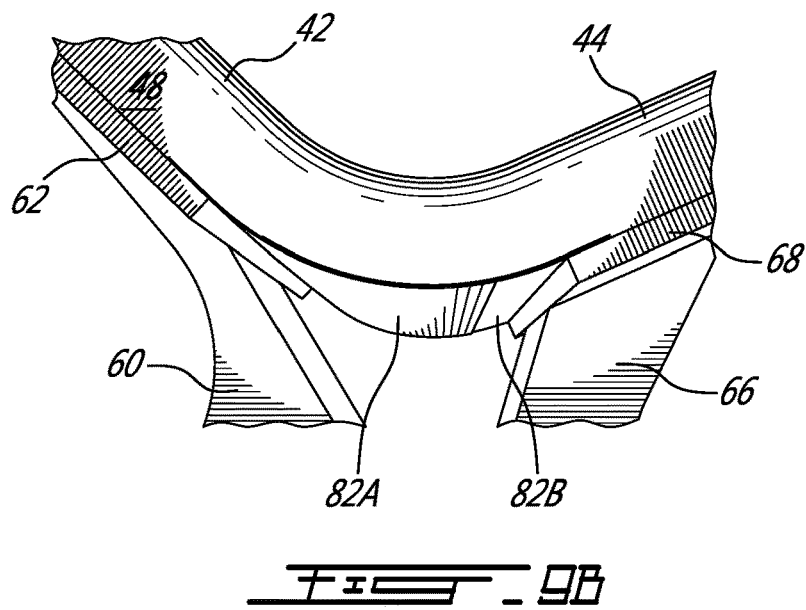
FIG. 9B is a perspective view of the bend location of the mattress when the lounge chair is in the reclined configuration.

FIGS. 9A and 9B show the bend location of mattress 48 in the bench and reclined configurations of lounge chair 26 respectively. The use of a single continuous mattress 48 that spans across the different occupant support portions of mattress 48 in combination with other elements of lounge chair 26 can promote occupant comfort. For example, the use of mechanism 54 can eliminate the need for hinges between backrest platform 62 and seat platform 68 that could create a bulge under mattress 48 and potentially cause some discomfort to an occupant.

In some embodiments, lounge chair 26 can be adapted to provide continuous support along mattress 48 across backrest portion 42 and seat portion 44 for increased comfort. In embodiments where a gap G is formed between backrest platform 62 and seat platform 68, lounge chair 26 can comprise some bridging support between backrest platform 62 and seat platform 68. Such bridging support can be configured to accommodate movement between backrest platform 62 and seat platform 68 while continuously supporting mattress 48 throughout the range of adjustment of lounge chair 26. In some embodiments, the bridging support can comprises first sheet 82A secured (e.g., fastened) to backrest platform 62 and second sheet 82B secured (e.g., fastened) to seat platform 68. Each sheet 82A, 82B can extend partially across gap G in an overhanging manner from its respective platform 62 or 68. Sheets 82A, 82B can overlap each other over some distance across gap G and be in a sliding engagement with each other to accommodate changes in the size of gap G during adjustment of lounge chair 26. Sheets 82A, 82B can comprise a suitable flexible and resilient material that can also accommodate the repeated changes in angular orientations of backrest platform 62 and seat platform 68 during adjustment of lounge chair 26. In some embodiments, sheets 82A, 82B can each be made of a suitable polymeric material for example.

Figure 9C:
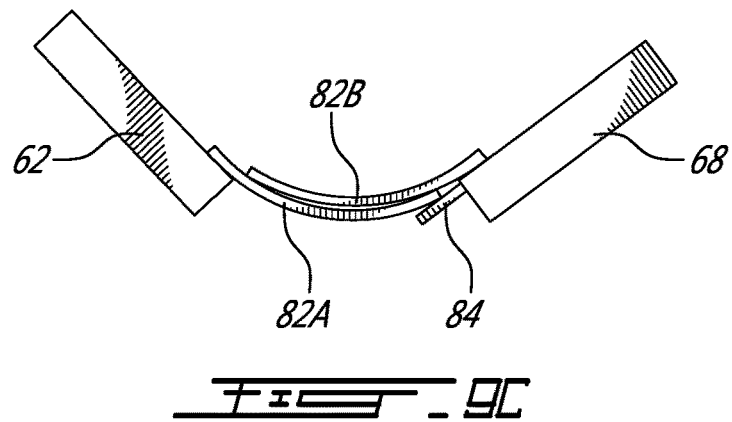
FIG. 9C is a schematic view of the bend location of the mattress when the lounge chair is in the reclined configuration.

FIG. 9C is a schematic view of the bend location of mattress 48 when lounge chair 26 is in the reclined configuration. Lounge chair 26 can comprise holder 84 that can support/guide sheet 82A to facilitate the bending of sheet 82A during adjustment of lounge chair 26. In turn, sheet 82A can support/guide sheet 82B to facilitate bending of sheet 82B during adjustment of lounge chair 26. Holder 84 can, for example, comprise a relative rigid member secured to or integral with seat platform 68 and which can be in sliding engagement with sheet 82A during adjustment of lounge chair 26.

The above description is meant to be exemplary only, and one skilled in the relevant arts will recognize that changes can be made to the embodiments described without departing from the scope of the invention disclosed. The present disclosure can be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A method of assembling a lounge chair comprising a mattress with an outer covering and a mechanism to facilitate adjustment of the lounge chair, the mechanism guiding movement of a backrest portion, a seat portion and a leg portion of the lounge chair, the mechanism being adaptable based on a property of the mattress selected for the lounge chair, said property of the mattress selected from the group comprising a material type of the outer covering, a thickness of the mattress and a firmness of the mattress, the method comprising:
adapting the mechanism based on the property of the mattress;
assembling the lounge chair using the mechanism adapted based on the property of the mattress;
receiving a component of the mechanism, a parameter of the component having: a first parameter value when the property of the mattress has a first property value; and a second parameter value different from the first parameter value when the property of the mattress has a second property value different from the first property value; and
assembling the lounge chair using the component;
wherein the mechanism is adaptable to produce a desired bending behavior of the mattress based on said mattress property, to reduce wrinkling of the outer covering when adjusting the lounge chair;
wherein the component of the mechanism is a curved rail and the parameter is a curvature of the curved rail;
wherein a pivot axis of the curved rail is associated with a neutral axis of the mattress; and
wherein the mechanism is adaptable to vary the pivot axis such that the neutral axis is positionable between a first position midway between an upper side and a lower side of the mattress and a second position wherein the neutral axis is closer to the upper side of the mattress than to the lower side of the mattress.

2. The method as defined in claim 1, wherein the material type of the outer covering has a resilience for accommodating repeated bending and flattening of the mattress.

3. The method as defined in claim 1, wherein the material type of the outer covering has a pliability for accommodating repeated bending and flattening of the mattress.

4. The method as defined in claim 1, wherein adapting the mechanism comprises adjusting a bend radius of the mattress.

5. The method as defined in claim 1, wherein adapting the mechanism comprises adjusting a location of a pivot axis for a portion of the mattress.

6. The method as defined in claim 1, wherein adapting the mechanism comprises adjusting a position of a neutral axis associated with a bend location of the mattress.

7. The method as defined in claim 6, comprising:
raising the position of the neutral axis when the property of the mattress is indicative of a first resilience; and
lowering the position of the neutral axis when the property of the mattress is indicative of a second resilience higher than the first resilience.

* * * * *